(12) United States Patent
Yamamoto et al.

(10) Patent No.: US 9,050,689 B2
(45) Date of Patent: Jun. 9, 2015

(54) METHOD FOR CUTTING CARBON FIBER SUBSTRATE

(75) Inventors: Kohnosuke Yamamoto, Nagoya (JP); Masaaki Yamasaki, Nagoya (JP); Toshihide Sekido, Nagoya (JP)

(73) Assignee: Toray Industries, Inc. (JP)

( * ) Notice: Subject to any disclaimer, the term of this patent is extended or adjusted under 35 U.S.C. 154(b) by 346 days.

(21) Appl. No.: 13/635,721

(22) PCT Filed: Dec. 14, 2010

(86) PCT No.: PCT/JP2010/072473
§ 371 (c)(1),
(2), (4) Date: Sep. 18, 2012

(87) PCT Pub. No.: WO2011/114592
PCT Pub. Date: Sep. 22, 2011

(65) Prior Publication Data
US 2013/0001206 A1    Jan. 3, 2013

(30) Foreign Application Priority Data
Mar. 19, 2010    (JP) .................. 2010-064763

(51) Int. Cl.
| | |
|---|---|
| B23K 26/40 | (2014.01) |
| D06H 7/22 | (2006.01) |
| B23K 26/38 | (2014.01) |
| B23K 26/14 | (2014.01) |
| B23K 26/16 | (2006.01) |
| B23K 26/30 | (2014.01) |

(52) U.S. Cl.
CPC ...... *B23K 26/38* (2013.01); *D06H 7/22* (2013.01); *B23K 26/4055* (2013.01); *B23K 26/407* (2013.01); *B23K 26/14* (2013.01); *B23K 26/16* (2013.01); *B23K 26/4085* (2013.01); *B23K 26/409* (2013.01); *B23K 26/423* (2013.01); *B23K 2203/16* (2013.01)

(58) Field of Classification Search
CPC .......... D06H 7/22; B23K 26/40; B23K 26/36; B23K 26/4055; B23K 26/407
USPC .............. 156/180, 181, 196, 211, 221, 272.8; 219/121.82, 121.67–121.72; 264/138, 264/257, 400, 482
See application file for complete search history.

(56) References Cited

U.S. PATENT DOCUMENTS

| | | | | |
|---|---|---|---|---|
| 4,680,442 A | * | 7/1987 | Bauer et al. | 219/121.67 |
| 4,741,233 A | * | 5/1988 | Mershon | 83/91 |
| 6,114,653 A | * | 9/2000 | Gustafson | 219/121.72 |

FOREIGN PATENT DOCUMENTS

| | | | |
|---|---|---|---|
| GB | 1173567 | * | 9/1966 |
| JP | 63085507 A | * | 4/1988 |
| JP | 04185761 A | * | 7/1992 |
| JP | 15891/1994 | | 3/1994 |

(Continued)

*Primary Examiner* — Samuel M Heinrich
(74) *Attorney, Agent, or Firm* — DLA Piper LLP (US)

(57) ABSTRACT

A method for laser-cutting a carbon fiber substrate such as a preform is configured from fabric material comprising at least carbon fibers, characterized by cutting the carbon fiber substrate at initial conditions which have been set so that the state of the substrate that is being cut with a laser can be suppressed with or prevented from deviating from a target state. By the method, it is possible to effectively solve various problems such as dissipation of heat, positional shifting from the focal length range of the laser, and soot, and the carbon fiber substrate can be stably cut at the target desired state.

9 Claims, 12 Drawing Sheets

(56) References Cited

FOREIGN PATENT DOCUMENTS

| JP | 6-158528 A | | 6/1994 |
|---|---|---|---|
| JP | 11067408 | * | 3/1999 |
| JP | 2000-285882 | | 10/2000 |
| JP | 2001159082 A | * | 6/2001 |
| JP | 2002-4167 A | | 1/2002 |
| JP | 2002-144058 A | | 5/2002 |
| JP | 2004-288489 A | | 10/2004 |
| JP | 2005-297547 A | | 10/2005 |
| JP | 2009-241119 A | | 10/2009 |

* cited by examiner

FIG. 5
(A) supporting at both sides
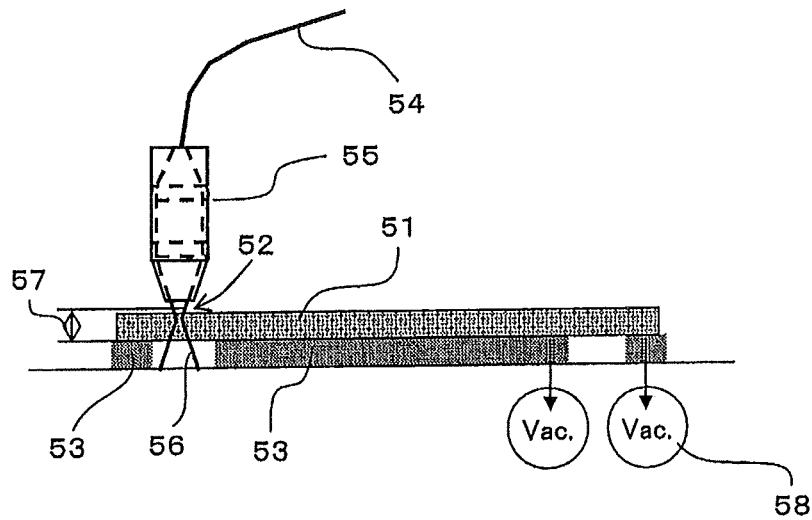
(B) supporting at one side
(B-1)
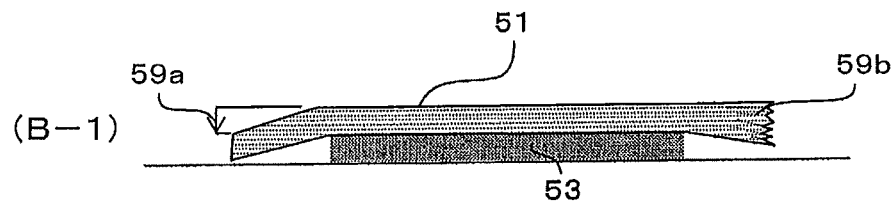
(B-2)
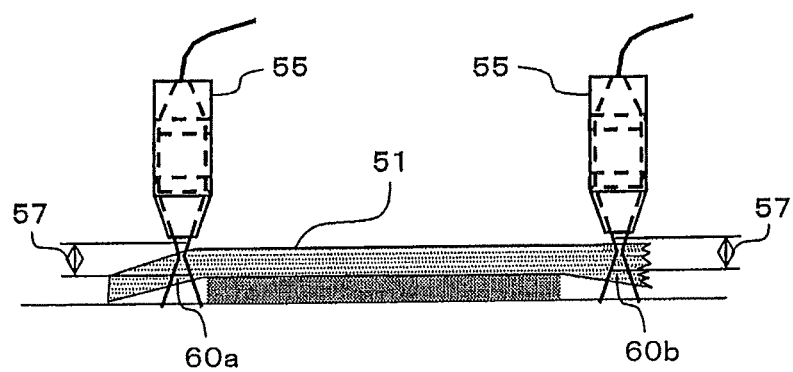

(A) supporting at both sides (B) holding at both surfaces

FIG. 7
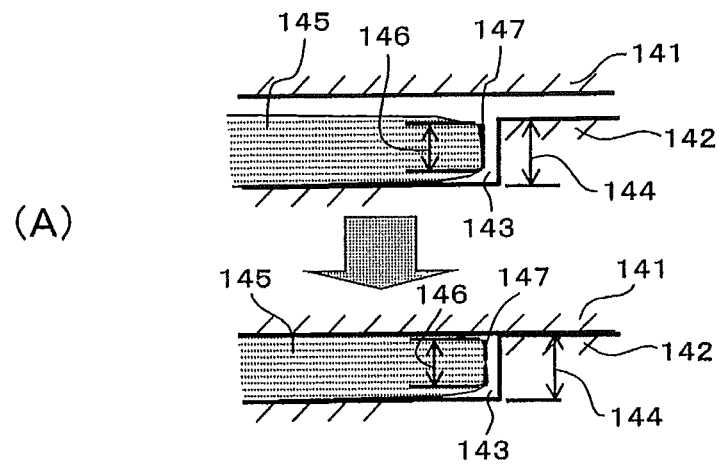
(A)
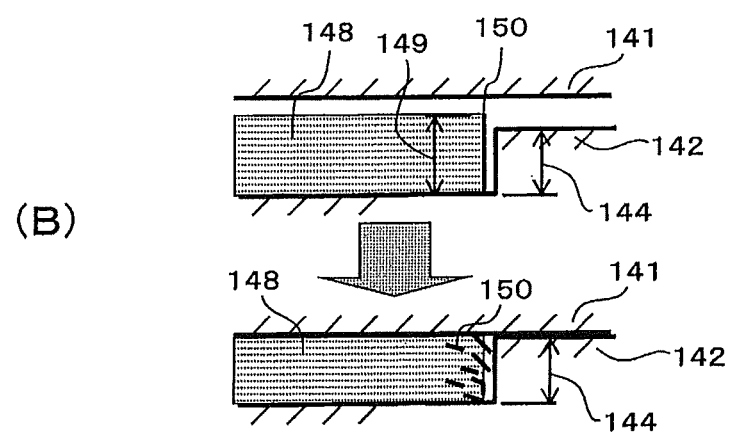
(B)
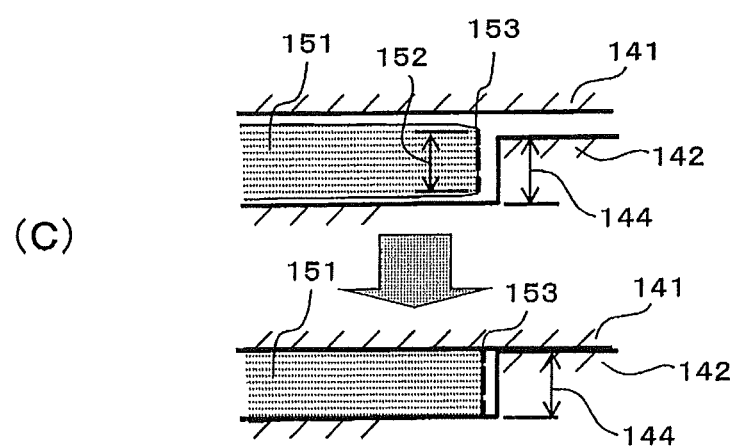
(C)

FIG. 9
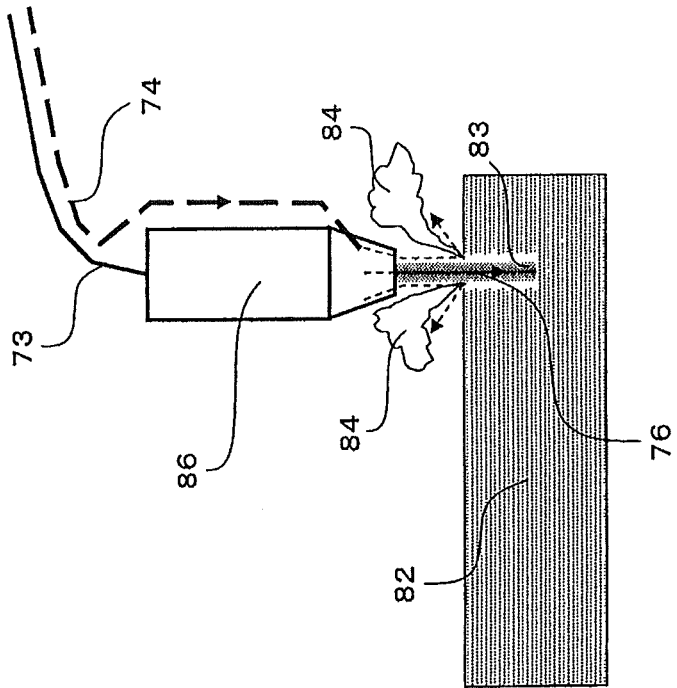
(B) inert gas : present
(inside of laser head is higher in pressure than circumference)
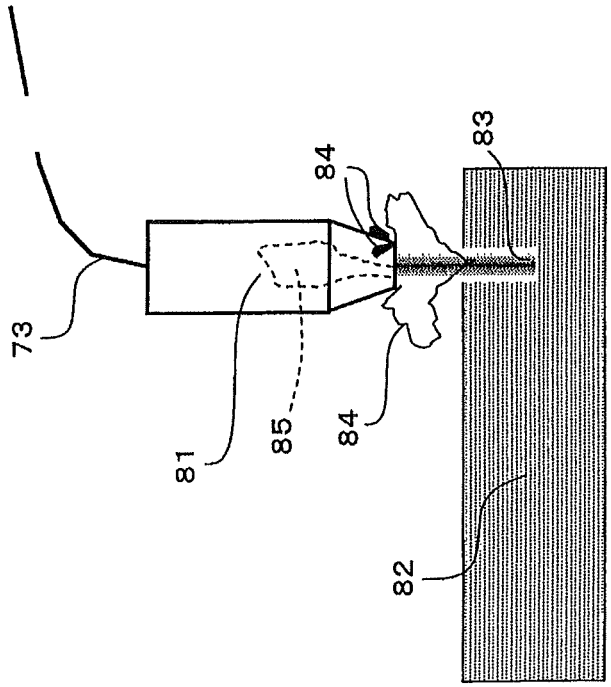
(A) inert gas : not present

METHOD FOR CUTTING CARBON FIBER SUBSTRATE

RELATED APPLICATIONS

This is a §371 of International Application No. PCT/JP2010/072473, with an international filing date of Dec. 14, 2010 (WO 2011/114592 A1, published Sep. 22, 2011), which is based on Japanese Patent Application No. 2010-064763, filed Mar. 19, 2010, the subject matter of which is incorporated by reference.

TECHNICAL FIELD

This disclosure relates to a method for cutting a carbon fiber substrate formed from a fabric material comprising carbon fibers and, specifically, to a method for cutting a carbon fiber substrate suitable in use for cutting a substrate, used for making a fiber reinforced plastic (hereinafter, also referred to as "FRP"), precisely at a predetermined shape.

BACKGROUND

Recently, to lighten the weight of airplanes, automobiles, etc., opportunities to employ fiber reinforced plastic used with carbon fibers (hereinafter, also referred to as "CFRP") have increased. For example, a CFRP using a carbon fiber woven fabric as a reinforcing fiber substrate, in which carbon fiber bundles are used, each comprising a plurality of carbon fibers arranged in one direction, is very advantageous in specific stiffness and specific strength as compared to metal materials, and it is employed for various parts.

As a process for molding such a CFRP, various processes are proposed such as prepreg/auto clave process, RTM (Resin Transfer Molding) process, RFI (Resin Film Infusion) process, processes from derived therefrom, etc. Among these processes, RTM process is paid attention to from a viewpoint of being able to obtain a CFRP having a complicated shape, for example, by preparing a carbon fiber substrate formed from a fabric material comprising carbon fibers or a laminate stacked with a plurality of the fabric materials, forming a preform with a predetermined shape in advance, and impregnating a matrix resin injected into a mold into the preform and curing the resin.

However, in a case where there is an attempt to cut the fabric or the laminate thereof comprising carbon fibers, or the preform formed therewith at a predetermined shape in advance (hereinafter, these are also called as a "carbon fiber substrate" as a generic term), into a predetermined shape by using a usual cutter, the following problems may occur. Namely, because a carbon fiber is very thin such as about 10 μm in diameter, in a case where it is attempted to cut the laminate of carbon fiber fabrics or the preform thereof by a cutter at a contact condition, the portion to be cut is cut under crushing conditions, also because of the hardness of carbon fiber itself. Therefore, by the repelling power, the carbon fibers are liable to be frayed at a cutting end surface. In particular, when the cutting is attempted after laminating fabrics and forming the preform, the cutting surface is liable to become uneven in the thickness direction.

If such a preform is disposed into a mold, a mismatch may occur between it and the cavity shape of the mold. In a case where the preform is larger than the mold, an additional cutting processing operation is conducted to adjust the shape to a size fitting to the mold, or to perform molding by containing the preform larger than the mold in the mold as it is. In the latter case, carbon fibers are contained up to a flash portion of CFRP after molding, and there occurs an inconvenience that the flash removing operation becomes troublesome. On the other hand, in a case where the preform is smaller, because a portion of only resin (resin rich portion) is formed in a gap between the preform and the mold, an operation for charging carbon fibers separately becomes necessary before injection of matrix resin. Further, even if the shapes of the preform and the mold almost coincide with each other, an end portion of the preform may be frayed, for example, when the preform is transferred to the mold and, therefore, it is difficult to completely suppress the mismatch.

For such carbon fibers that are easily frayed, a technology is known wherein carbon fibers are to be bound with one another. For example, as a technology for binding carbon fibers, a process for obtaining a sheet-like molded material from carbon fibers formed as short fibers (about 3-20 mm) via a phenolic resin and the like is described in JP-A-2004-288489 and JP-A-2005-297547. As a method for making this sheet-like molded material, a method is described wherein short carbon fibers are dispersed randomly in a two-dimensional plane, and they are calcined together with the phenolic resin in an inert atmosphere at a high temperature of about 200° C. or higher. The sheet-like molded material described in those publications is used suitably for a carbon fiber electrode, and it is not used by additionally impregnating a matrix resin into the sheet-like molded material. Further, since the whole of the short carbon fibers themselves are carbonized because of the calcination at a high temperature of about 200° C. or higher, the elastic modulus, the strength, etc. of the short carbon fibers themselves cannot be exhibited.

To address the problem as aforementioned that the cutting end surface is liable to be frayed and the carbon fiber substrate is hard to be precisely cut at a predetermined shape when the substrate is cut using a usual cutter, although not published, a technology has been proposed wherein by generating a specified-nature graphitized portion (for example, membrane-like graphitized portion) on the cutting end surface, while achieving an easy cutting to a predetermined shape, fraying of carbon fibers at the cutting end surface and the like can be prevented (Japanese Patent Application No. 2000-285882), and in that proposal, it is also described that such a cutting may be achieved by cutting with a laser (laser ray).

However, it has become clear that there remain the following problems in case the carbon fiber substrate is thus cut by a laser. First, in a laser processing, because the sublimation cutting temperature of carbon fibers is about 3,800° C. to be higher than that of a metal (about 1600° C. in the case of iron) and a difference between an atmosphere temperature and the cutting temperature is great, the thermal energy is liable to be dissipated. Although the thermal conductivity of carbon fiber itself is higher than that of a general inorganic substance, depending upon the formation of a substrate formed from a fabric material, because there is a case where the thermal conductivity of the substrate in a cutting processing direction, that is, a thickness direction (especially, a thickness direction of a substrate comprising a laminate) becomes extremely low as compared with that of a metal, heat supply through the substrate itself in the thickness direction is hardly achieved, and it may become difficult to reach the cutting temperature of the substrate. If the cutting temperature by a laser is not sufficiently elevated, namely, if it is not elevated up to the sublimation cutting temperature of carbon fibers, a cutting defective place may occur.

Further, in the laser cutting, there is a focal distance capable of processing (a focal distance for convergence), and in a case where the substrate is one easy to be deformed, there is a fear that the portion to be cut may shift from the range of the focal distance capable of processing and it shifts, a cutting defective place also may occur.

Accordingly, to address the above-described problems when the carbon fiber substrate is cut by a laser and other problems accompanying with the laser cutting, it could be helpful to provide a method for cutting a carbon fiber substrate capable of performing a laser cutting, that can expect an excellent cutting performance and an excellent cutting end surface form as aforementioned for cutting of a carbon fiber substrate, stably at a target desired condition.

SUMMARY

We provide a method for cutting a carbon fiber substrate characterized in that, when a carbon fiber substrate configured from a fabric material comprising at least carbon fibers is cut with a laser, the substrate is cut at initial conditions which have been set so that the state of the substrate that is being cut with the laser can be suppressed with or prevented from deviating from a target state.

The carbon fiber substrate configured from a fabric material comprising at least carbon fibers includes a carbon fiber substrate configured from substantially any fabric material comprising carbon fibers, and includes both of the fabric material as a single material and a laminate. Further, as the formation of the fabric material, for example, a unidirectional woven fabric substrate arranging carbon fibers in one direction, a multiaxial stitched substrate, and formation such as a non-woven fabric, a plain weave, a twill weave, knitting or a braid, are included, and further, a hybrid configuration with glass fibers or organic fibers may be employed. Further, in the case of a substrate having a laminate configuration, except a fabric material comprising carbon fibers, a fabric material comprising glass fibers, aramide fibers, PBO (polyparaphenylene benzobisoxazol) fibers, boron fibers, alumina fibers and the like may be contained. Then, a preform wherein such a substrate is formed in advance in a predetermined shape (including both two and three dimensional shapes) is also included as a carbon fiber substrate. As a preferable formation of the above-described substrate, a substrate configured from the above-described carbon fiber containing fabric material comprising carbon fibers of continuous fibers is raised and, more preferably, a carbon fiber containing fabric material comprising only carbon fibers is raised. Moreover, although we mainly target a so-called "dry carbon fiber substrate" into which a resin (matrix resin) is not impregnated, a substrate into which a resin is impregnated, for example, a prepreg into which a resin is impregnated at a condition of so-called "B-stage" before being cured, is also included in the carbon fiber substrate.

In such a method for cutting a carbon fiber substrate, specified initial conditions capable of suppressing with or preventing from deviating from a target state as the state of the substrate at the time of being cut with the laser are set, and under the conditions the substrate is cut. This suppressing with or preventing from deviating from a target state means suppressing or preventing undesired dissipation of heat due to the laser for cutting as aforementioned, preventing shifting from the range of the laser focal distance capable of processing a portion of the substrate to be cut, further, suppressing or preventing clogging of a head for irradiating the laser or the like. By setting initial conditions capable of suppressing or preventing deviating or shifting from a target state for the state at the time of cutting the substrate with the laser, an undesired state at the time of cutting can be avoided, and the cutting of the substrate with the laser can be performed stably at a desired target state.

As a more concrete example, a method can be employed wherein, when the carbon fiber substrate is cut with the laser at a condition being placed on a receiving jig, the substrate is partially received by the receiving jig. This is to realize a form where the heat is hardly dissipated at the time of laser cutting by partially receiving the substrate by the receiving jig basically at a portion in which the heat transfer from the substrate hardly occurs. Namely, as aforementioned, the sublimation cutting temperature of carbon fibers is about 3,800° C. to be higher than that of a metal, and because a difference between the atmospheric temperature and the cutting temperature is great, thermal energy is liable to be dissipated. Further, because thermal conductivity in a cutting processing direction, that is, a thickness direction of the substrate, is low as compared with that of a metal, heat supply through the substrate itself in the thickness direction is hardly achieved, and there is a feature that the temperature at a portion to be cut in the thickness direction hardly reaches the cutting temperature. Therefore, in cutting such a substrate comprising carbon fibers, it is necessary to greatly suppress the dissipation of thermal energy, and a jig structure becomes important which can set parameters relating to dissipation of thermal energy (thermal conductivity, contact area, temperature difference with a contact object, time for heating and the like are in proportion to the amount of dissipation, and distance with a contact object is in inverse proportion thereto) at adequate ranges. Further, instead of dissipation of thermal energy, or depending upon dissipation of thermal energy, if the thermal capacity of the jig brought into contact with the substrate to be cut is set as small as possible, the jig is elevated in temperature in a short time, and the dissipation of thermal energy may be prevented.

In such a structure, more concretely, it is preferred that a cutting position of the substrate is set at a position where the substrate is not brought into contact with the above-described receiving jig. To prevent the thermal energy irradiated to the carbon fiber substrate from dissipating through the receiving jig, it is better to set the distance between the receiving jig and the cutting point great. Namely, it is better not to receive the back surface of the cutting line. On the other hand, if the distance with the cutting point is too great, because the substrate is liable to deflect and shift from the focal length range, it is required to be set at an adequate distance. For example, as a preferable range of the distance, ranges of 1 mm to 200 mm, 2 mm to 100 mm, and further, 3 mm to 75 mm, can be exemplified. Since the rigidity increases if the thickness of the substrate increases, the maximum distance can also be increased depending upon the thickness. Further, the dissipation of thermal energy through the receiving jig is more remarkable at a substrate receiving position in the fiber extending direction (thermal conductivity is high in this direction) and, therefore, the distance between the receiving jig and the cutting point may be changed depending upon the direction of the fiber. For example, in a woven fabric substrate such as a cloth material, the receiving jig may be disposed under a fiber bundle extending in a direction so as not to directly come into contact with fibers present on the cutting line.

Further, it is also preferred that a contact supporting portion of the receiving jig relative to the substrate is set at a strip-like, linear or dot-like form. If the substrate is supported by such a contact supporting portion, the contact area between the receiving jig and the substrate can be surely reduced, and the undesired thermal dissipation can be surely decreased.

Moreover, it is also preferred that a contact surface to the substrate of the receiving jig is formed from a material having at least a heat insulation property. In such a structure, the thermal conductivity between the substrate and the receiving jig can be reduced, and the undesired thermal dissipation can be decreased more securely.

Further, in the method for cutting a carbon fiber substrate, it is preferred that, when the carbon fiber substrate is cut with the laser at a condition being placed on a receiving jig, the substrate is supported by the receiving jig at both sides of a cutting position. To cut the substrate efficiently and quickly, it is desired that the position of the substrate to be cut does not shift from a predetermined range of the laser focal distance. A carbon fiber substrate, especially, a dry substrate into which a resin is not impregnated, has a relatively high flexibility, and it is easily deflected. Therefore, to prevent the cutting point from shifting from a predetermined range of laser focal distance due to occurrence of a large deflection, the substrate is supported at both sides of the cutting position, and a two-sided supporting condition is realized to suppress the deflection small. In particular, because an end portion of the substrate is liable to hang down and an interlayer portion is liable to be delaminated in the case of a laminate substrate, in the case where the end portion is cut, it is preferred to support the substrate by the receiving jig at both sides of the cutting position. To support and fix the substrate more securely at least one portion among the portions at both sides of the cutting position, for example, a vacuum attraction function may be provided to the receiving jig. Further, the substrate may be held from both surface sides at least one portion. For holding from both surface sides, for example, a magnetic force may be utilized, and a mechanical-type holding may also be employed.

Further, in the method for cutting a carbon fiber substrate, although a laser head is used for irradiating with a laser, there is a fear that soot as a sublimation substance of the substrate from the cutting portion may enter into the laser head and it may cause clogging of the laser irradiating route. To remove such a fear, it is preferred that a gas (as a preferable gas, an inert gas, for example, nitrogen gas, is exemplified) is injected together with irradiation of laser from inside of the laser head. It is preferred that this gas is injected coaxially with irradiated laser to effectively prevent entering or adhesion of soot. Further, it is preferred that inside of the laser head is kept at a condition higher in pressure than outside of the laser head to prevent soot from entering into the laser head from outside.

Furthermore, it can also be done to remove the soot more positively. For example, a method may also be employed wherein a suction means is provided to the laser head, and soot generating at the time of cutting the substrate is suctioned. Because the soot rises upwardly, it is preferred that the suction port of the suction means is disposed at a position including a height portion of the cutting point or higher. Further, when the gas is injected, because the soot is more or less blown to the back surface side of the substrate, it is more preferable to provide a suction port also at the back surface side (avoiding the laser ray).

Further, in the method for cutting a carbon fiber substrate, as aforementioned, as the carbon fiber substrate to be cut, a form of a laminate and a form of a preform, which is formed in a predetermined shape in advance, are both targeted. In the case of the form of a laminate, it is preferably a laminate formed by integrating fabric materials each provided with a particle-like resin on at least one surface with each other by adhesion via the resin. By such an integration by adhesion via the resin, a predetermined laminate structure hardly collapses, and a formed shape may be kept even if formed as a preform.

Thus, in the method for cutting a carbon fiber substrate, when the carbon fiber substrate is cut by a laser, it becomes possible to effectively solve various problems such as dissipation of heat, shift from a range of laser focal length and soot, and the cutting of the carbon fiber substrate can be performed stably at desired target conditions.

BRIEF DESCRIPTION OF THE DRAWINGS

FIG. 5 depicts schematic diagrams showing problems generatable in case of supporting at both sides (A) and in case of supporting at one side (B) by a receiving jig.

FIG. 7 depicts schematic diagrams exemplifying respective states at the time of closing a mold that occur in accordance with relationship in size between an actual thickness of a cutting portion and a thickness of a cavity of the mold.

FIG. 9 depicts schematic diagrams exemplifying a problem of soot and treatment method thereof.

Figure 1:
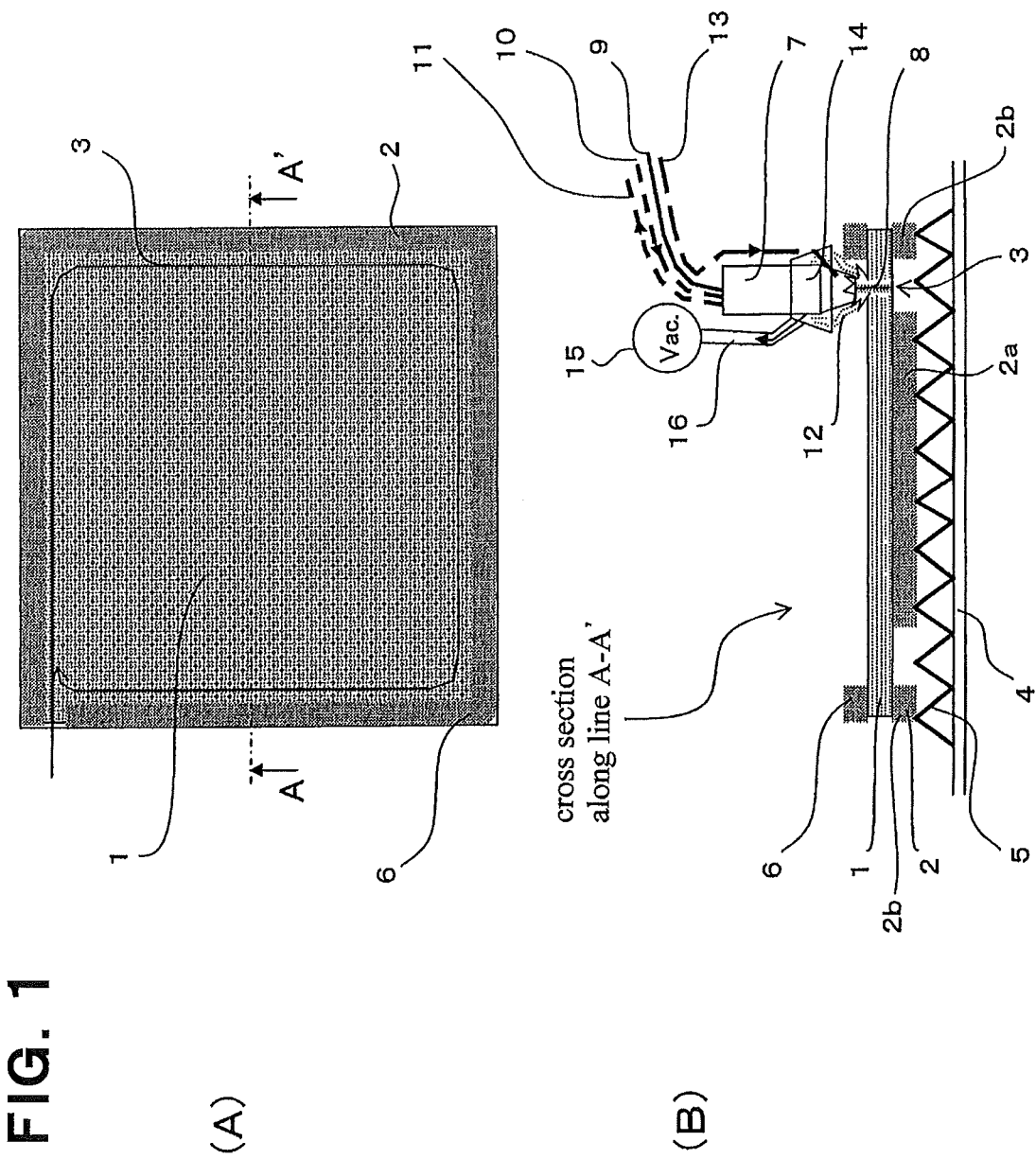
FIG. 1 depicts schematic diagrams showing a method for cutting a carbon fiber substrate according to an example of our method.

EXPLANATION OF SYMBOLS 1, 21, 51, 61, 75, 82: preform
2, 2a, 2b, 22, 23, 24, 25, 32, 41, 43, 45, 47, 48, 53, 63, 69, 94: receiving jig
3, 31a, 31b, 52, 62: cutting position
4: base
5, 95: bed
6: pressing jig
7, 55, 64, 72, 81, 86, 117: laser head
9, 54, 73, 118: optical fiber
10, 130: cooling water forward line
11, 131: cooling water return line
12, 84, 85: soot
13, 74, 129: inert gas supply line
14: suction case
15, 93, 97, 119: vacuum pump
16, 92, 96, 120, 125: suction line
33: contact portion
34: non-contact portion
42, 44, 46, 49: heat insulation material
57, 68: range capable of cutting
58: suction mechanism
59a: hanging
59b: interlayer delamination
60a, 60b: portion being not cut
65, 76: inert gas
66, 67: deflection
91: skirt for suction 101: carbon fiber fabric
102: particle-like resin
111, 116: articulated robot
112: three-dimensional preform
114: cutting apparatus
115: treatment table
121, 128: filter
122: drain
123: valve
124: pressurized air line
126: drain line
127: three way electromagnetic valve
141: upper mold
142: lower mold
143: cavity
144: cavity thickness
145, 148, 151: preform
146, 149, 152: thickness of cut portion
147, 150, 153: membrane-like graphitized portion

DETAILED DESCRIPTION

Hereinafter, selected examples of our method will be explained referring to figures.

FIG. 1 shows cutting a carbon fiber substrate according to an example of our method, in particular, an example for cutting a circumferential edge portion of a preform, formed as a laminate of fabric materials comprising carbon fibers, with a laser. As shown in FIG. 1(A), a preform 1 is placed on a receiving jig 2, and cutting with a laser is performed along a cutting line (a cutting position 3) extending along the circumferential edge of preform 1. As shown in FIG. 1(B), receiving jig 2 is provided on a bead 5 formed as a corrugated plate on a base 4, and preform 1 is placed on this receiving jig 2. Preform 1 is partially received by receiving jig 2, and receiving jigs 2a, 2b are located at both sides of the cutting position. At the supporting position by receiving jig 2b, preform 1 is held from both surface sides using a pressing jig 6.

A laser ray 8 for cutting is irradiated from a laser head 7 toward cutting position 3, and by moving head 7 or base 4, the laser cutting is performed along the cutting line shown in FIG. 1. Cutting position 3 is set at a position where preform 1 does not come into contact with receiving jig 2 (a position between receiving jigs 2a, 2b). Laser ray 8 irradiated from laser head 7 is introduced into head 7 through an optical fiber 9, it is converged at a condition where the focal length is adjusted at the cutting portion of preform 1 in its thickness direction, and it is served to cutting. In laser head 7, cooling water is circulated through a cooling water forward line 10 and a cooling water return line 11 to suppress overheating. Further, to prevent clogging of the inside of head 7 and the like ascribed to soot 12 generated at the time of cutting, an inert gas (for example, nitrogen gas) supplied from an inert gas supply line 13 is injected toward cutting position 3 through head 7 at a coaxial condition with irradiated laser ray 8. Further, a bell-like suction case 14 spreading downwardly is provided on laser head 7, and soot 12 rising from cutting position 3 is gathered in suction case 14, and is removed by suction through a suction line 16 by a suction device such as a vacuum pomp 15.

In the cutting of preform 1 using such a device, since preform 1 does not come into contact with receiving jig 2 at cutting position 3 by laser ray 8, dissipation of heat required for the cutting is suppressed. Further, because preform 1 is supported by receiving jigs 2a, 2b at both sides of cutting position 3, shifting the cutting position from a proper laser length range of laser ray 8 ascribed to deflection of preform 1 can be avoided, and predetermined desired cutting conditions can be maintained. Furthermore, because the inert gas is supplied and injected into laser head 7 and soot 12 is adequately sucked and removed, clogging of laser head 7 can be prevented, and desired laser cutting conditions can be maintained stably.

Figure 2:
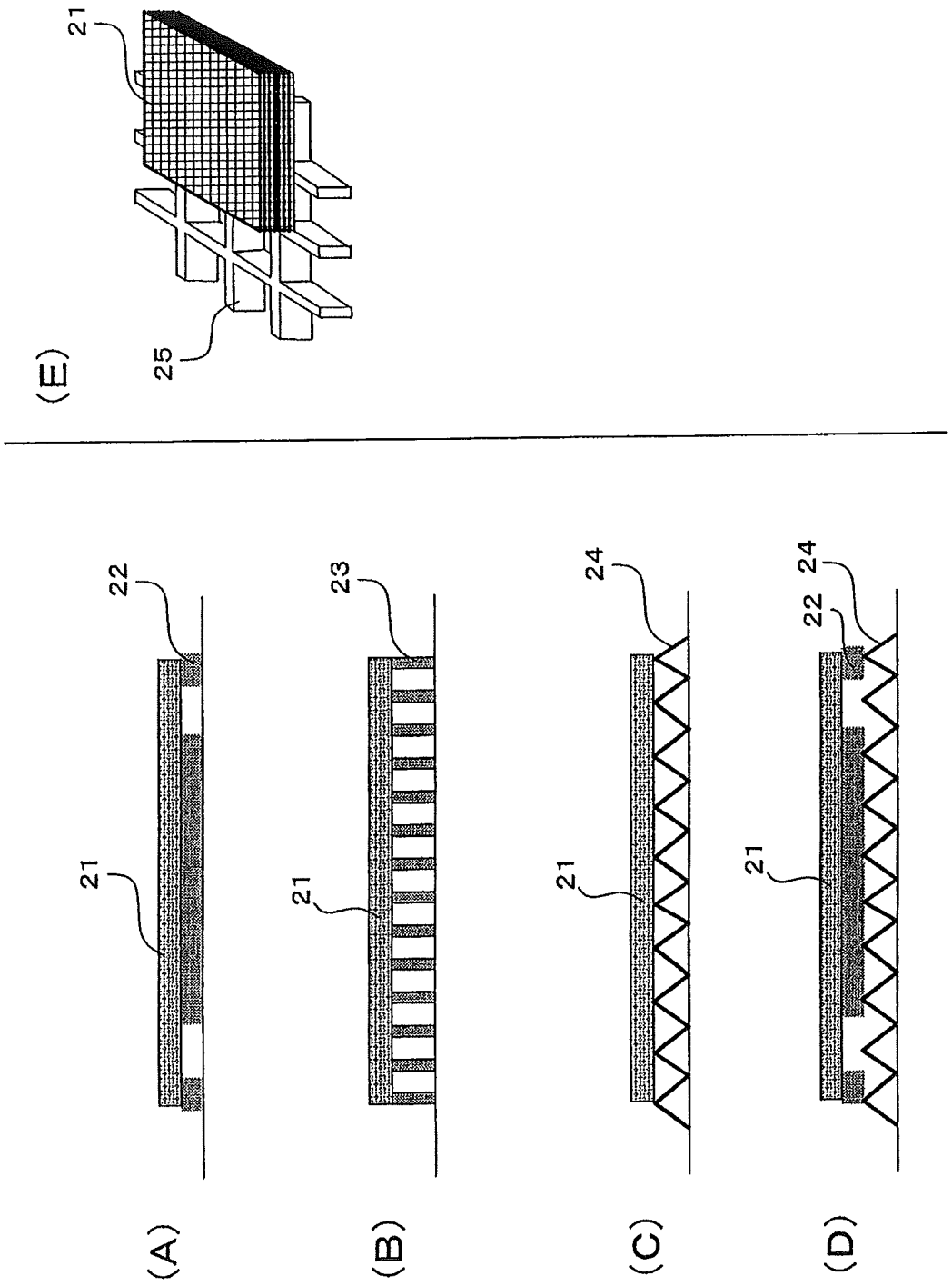
FIG. 2 depicts schematic diagrams showing respective examples for a receiving jig.

FIG. 2 shows respective examples when a preform provided as a carbon fiber substrate is received by a receiving jig. In the example shown in FIG. 2(A), a preform 21 is received by a plurality of strip-like receiving jigs 22 as described above, and the cutting position is set between receiving jigs 22. In the example shown in FIG. 2(B), preform 21 is received by a plurality of receiving jigs 23 standing in pin-like shapes, and by receiving at a condition of dot-like contact, the contact area is reduced for suppressing dissipation of heat. In the example shown in FIG. 2(C), preform 21 is received by a receiving jig 24 comprising a corrugated plate formed in a zigzag shape in cross section, and by receiving at a condition of linear contact, the contact area is reduced to suppress dissipation of heat. In the example shown in FIG. 2(D), a plurality of strip-like receiving jigs 22 and receiving jig 24 comprising a corrugated plate are combined, preform 21 is received by the plurality of strip-like receiving jigs 22, and receiving jig 24 comprising a corrugated plate functions as not a jig directly receiving preform 21 but a bed as shown in FIG. 1. By forming this bed as a corrugated plate structure, heat transfer through the receiving jig 22 toward the bed or the base side is suppressed, and dissipation of heat in the laser cutting is suppressed. In the example shown in FIG. 2(E), preform 21 is received by a well crib-like or lattice-like receiving jig 25, and the contact area is also reduced for suppressing dissipation of heat.

Figure 3:
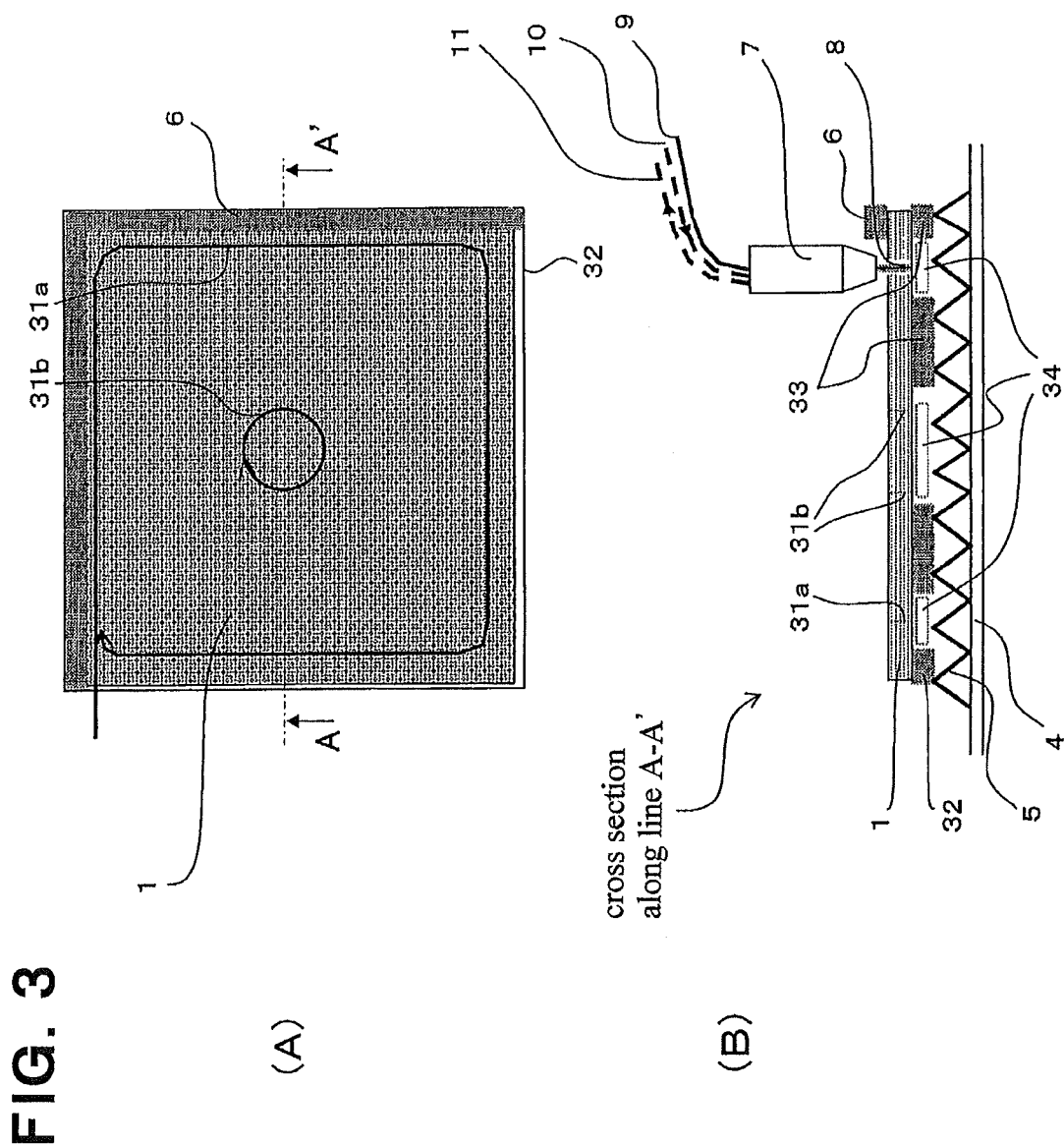
FIG. 3 depicts schematic diagrams showing a method for cutting a carbon fiber substrate according to another example.
Figure 4:
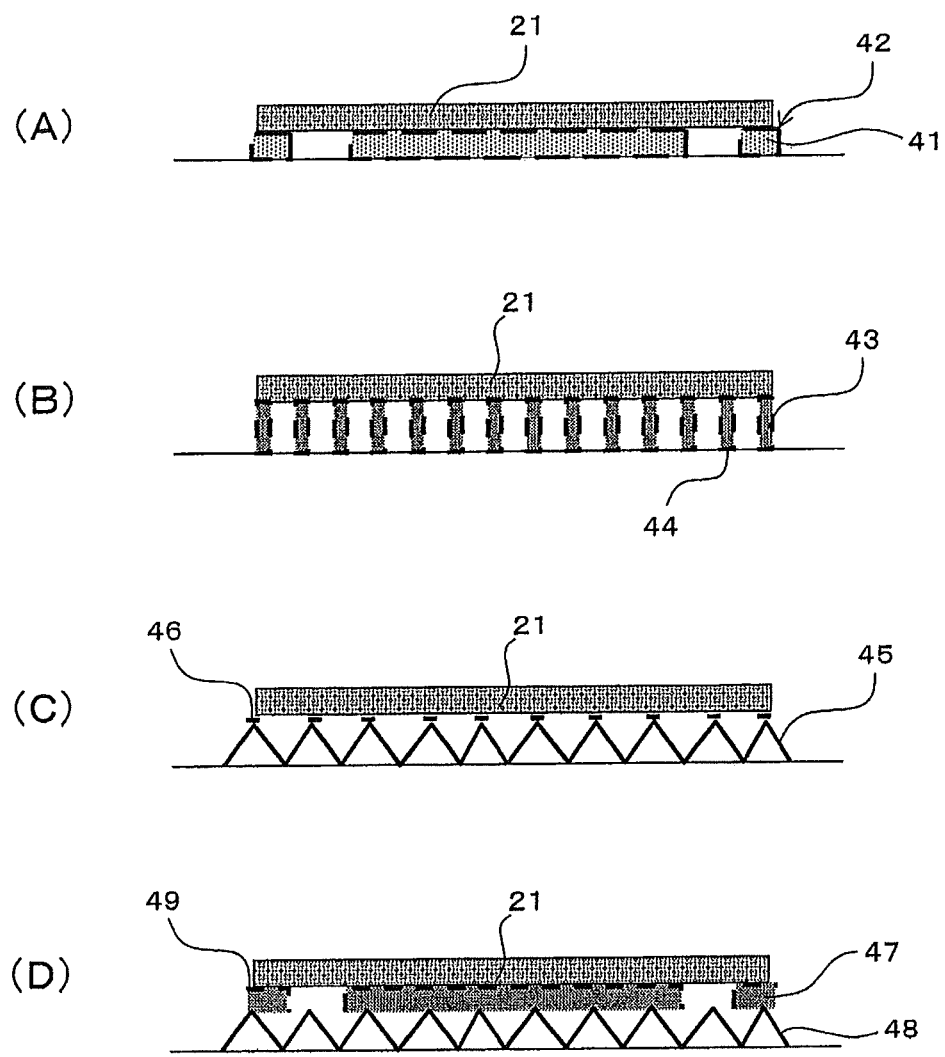
FIG. 4 depicts schematic diagrams showing other respective examples for a receiving jig.

FIG. 3 shows a case where the cutting position comprises a plurality of cutting positions 31a, 31b distanced from each other as compared with the example shown in FIG. 1, and depending upon these cutting positions 31a, 31b, contact portions 33 and non-contact portions 34 of preform 1 with a receiving jig 32 are adequately set. Thus, in accordance with the positions and the number thereof to be cut in preform 1, it is possible to appropriately set the divisional form and the like of receiving jig 32. Because other structures are similar to those shown in FIG. 1, the explanation will be omitted by allotting the same symbols to those structures as those in FIG. 1.

FIGS. 4(A) to (D) show examples employing heat insulation material structures as compared with the examples shown in FIGS. 2(A) to (D). In the example shown in FIG. 4(A), preform 21 is received by a receiving jig 41 having a shape similar to that shown in FIG. 2(A), and receiving jig 41 itself is composed of a heat insulation material, or a layer of a heat insulation material 42 is provided on the surface of receiving jig 41. By interposing such a heat insulation material 42, dissipation of heat in the laser cutting is suppressed more efficiently. In the example shown in FIG. 4(B), preform 21 is received by a plurality of receiving jigs 43 stood in pin-like shapes similar to those shown in FIG. 2(B), and a surface-layer heat insulation material 44 is provided on each receiving jig 43. By providing such a surface-layer heat insulation material 44, dissipation of heat in the laser cutting is suppressed more efficiently. In the example shown in FIG. 4(C), preform 21 is received by a receiving jig 45 comprising a corrugated plate formed in a zigzag shape in cross section similar to that shown in FIG. 2(C), and by interposing a heat insulation material 46 at the peaks of the zigzag shape which are contact portions of receiving jig 45 with preform 21, dissipation of heat in the laser cutting is suppressed more efficiently. In the example shown in FIG. 4(D), a plurality of strip-like receiving jigs 47 and receiving jig 48 comprising a corrugated plate are combined similarly in the structure shown in FIG. 2(D), and by interposing a heat insulation material 49 at the side of the contact portion of strip-like receiving jig 47 brought into contact with preform 21, dissipation of heat in the laser cutting is suppressed more efficiently. Further, the method for interposing the above-described heat insulation material is a method for dividing a heat insulation function from the functions required for the receiving jig and, for example, if the frame of a receiving jig is composed of a metal and a glass fiber woven fabric and the like which forms a thin heat insulation layer is attached as the surface layer, the positioning of the preform and the heat insulation at the time of processing can both stand and such a structure can be employed preferably.

As aforementioned, the cutting position in the thickness direction of the substrate must be in an adequate range of laser focal length. To achieve this, the deflection of the carbon fiber substrate at the cutting position must be suppressed as small as possible. In particular, in the case where the cutting position is present at the end portion of the substrate, it is necessary to pay attention to the amount of deflection of the substrate.

FIG. 5 exemplifies with respect to methods of suppressing the deflection of a preform as a carbon fiber substrate to be small. FIG. 5(A) shows an example wherein receiving jigs 53 are disposed at both sides of a cutting position 52 of a preform 51, and in the case where a laser ray 56 sent from an optical fiber 54 to a laser head 55 is irradiated, laser ray 56 has a certain focal length, and the vicinity of the focus thereof becomes a range capable of cutting 57 in the thickness direction of preform 51. If the portion to be cut in the thickness direction of preform 51 gets out of this range capable of cutting 57 by deflection and the like, there is a fear that a cutting defective portion or a portion being not cut may occur. To prevent such an undesired deflection of preform 51, the receiving jigs 53 are disposed at both sides of cutting position 52 and the distance between jigs 53 must be adequately set. For a preform 51 which is liable to be deflected, it is necessary to set a relatively small distance. Then, to hold preform 51 at receiving jigs 53 present at both sides more securely as shown in the figure, it is preferred that a suction means 58 capable of attracting preform 51 is provided. More preferably, as shown in the figure, it is preferred that respective suction means 58 are provided for receiving jigs 53 present at both sides. However, when a partial cutting in the thickness direction of the preform is required, it can also be done to produce a partially cut preform by intentionally shifting the focus.

In a case where the end portion of preform is cut with a laser, there is a case where it is difficult to support the portions at both sides of the cutting position and a support at one side is inevitably employed. In such a case, for example, as shown in (B-1) of Fig. (B), although a hanging 59a or an interlayer delamination 59b in a case of a laminate is liable to occur, and in such a case, as shown in (B-2) of Fig. (B), if a portion shifting from the range capable of cutting occurs in preform 51, there is a possibility that a portion being not cut 60a or 60b may occur in the portion. Therefore, in a case where the end portion of preform 51 is cut with a laser, to the utmost, supporting at both sides of the cutting position is desired.

Figure 6:
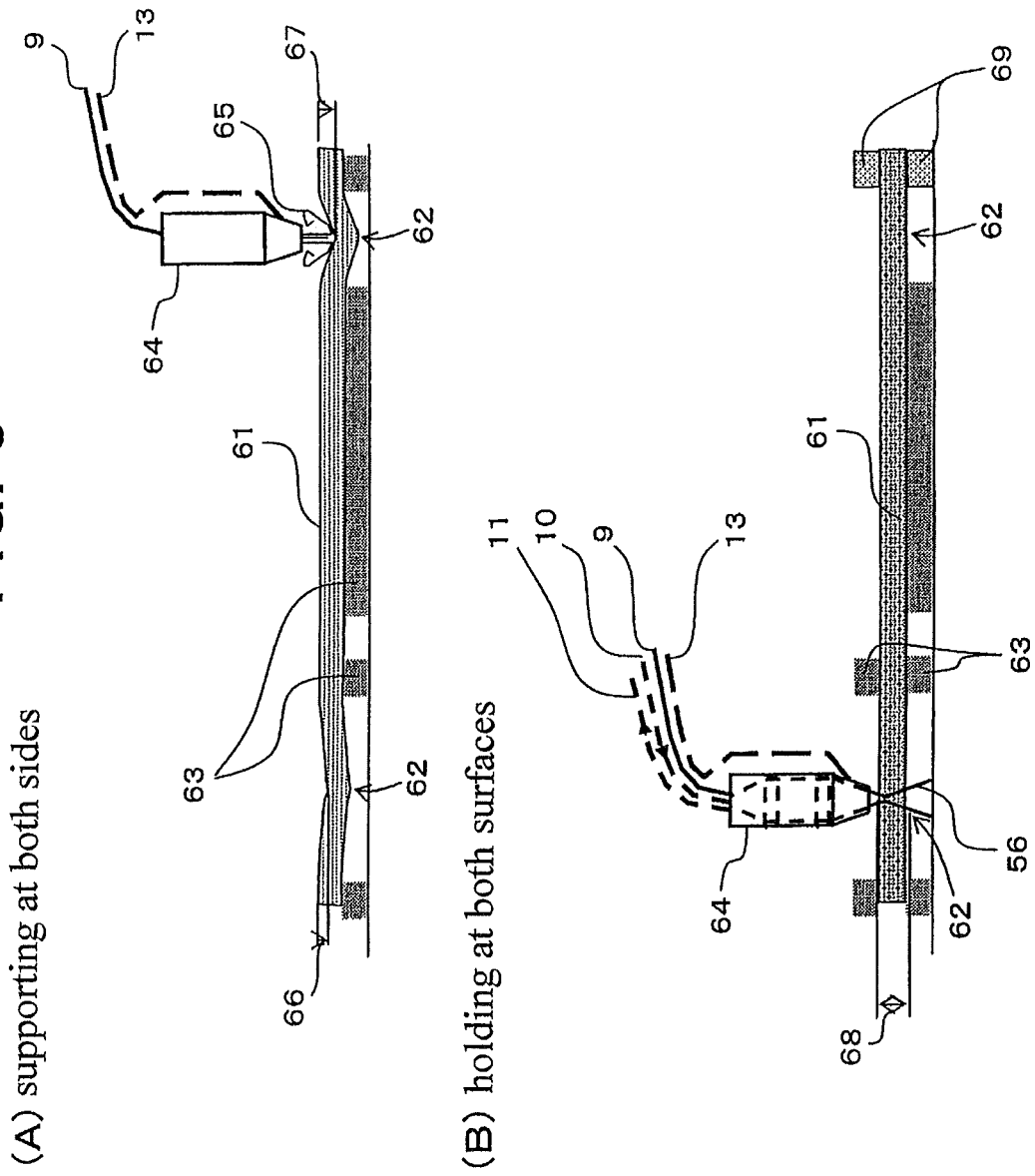
FIG. 6 depicts schematic diagrams showing a problem generatable in case of merely supporting at both sides by a receiving jig (A) and a problem generatable in case of holding a substrate at both surfaces (B).

Further, as shown in FIG. 6(A), when cutting is performed at a condition where a preform 61 is merely received by a receiving jig 63 from the lower side at both sides of a cutting position 62 of preform 61, in a case where a deflection 66 (a hanging) is liable to occur in preform 61, or in a case where, when an inert gas 65 is injected from a laser head 64 as aforementioned, a deflection 67 occurs in preform 61 at the cutting position 62 by the pressure of the injection, and the like, there is a fear of getting out of the range capable of cutting determined around the focal length of the laser ray. In such a case, as shown in FIG. 6(B), it is preferred that, by a structure wherein at least one of receiving jigs 63 provided at both sides of cutting position 62 of preform 61 holds the preform 61 from both surface sides, the deflection of preform 61 is suppressed within a range capable of cutting 68. In this case, as shown in the left-hand part of FIG. 6(B), a mechanical cramping is possible, and as shown as receiving jigs 69 at the right-hand part, a structure can also be employed wherein receiving jigs 69 at both surface sides are attracted to each other by utilizing a magnetic force.

Further, in a case where the preform is held from the both surface sides as described above, the thickness of the cutting portion is preferably as follows. As shown in FIG. 7(A), in a case where a thickness 144 of a cavity 143 formed by an upper mold 141 and a lower mold 142 at the time of mold closing is predetermined such as that in particular in RTM and the like, a thickness 146 of the actually cut portion (cutting end portion) of a preform 145 is preferably smaller than the cavity thickness 144, and further preferably smaller by 0.05 mm or more. In such a structure, for example, in a case where a specified-nature membrane-like graphitized portion 147 is generated on the cutting end surface and fraying of carbon fibers and the like on the cutting end surface is prevented as aforementioned (in a case where the technology previously proposed in Japanese Patent Application No. 2000-285882 is applied), it is prevented to give a bad influence to the membrane-like graphitized portion 147 at the time of mold closing. As shown in FIG. 7(B), in a case where a thickness 149 of the actually cut portion of a preform 148 is greater than the above-described cavity thickness 144, there is a fear that, at the time of mold closing, a bad influence may be given to a specified-nature membrane-like graphitized portion 150 generated on the cutting end surface (for example, in the example depicted in the figure, the membrane-like graphitized portion 150 may be damaged, or destroyed). Further, as shown in FIG. 7(C), in case where the above-described cavity thickness 144 and a thickness 152 of the actually cut portion of a preform 151 almost coincide with each other, a formation is achieved wherein a membrane-like graphitized portion 153 is held by upper and lower molds 141, 142 at the time of mold closing, there is a possibility that a resin injected in RTM does not enter into a portion between the membrane-like graphitized portion 153 and the mold, and the resin is liable to be cracked from the position of the membrane-like graphitized portion 153 formed as a trigger point.

Figure 8:
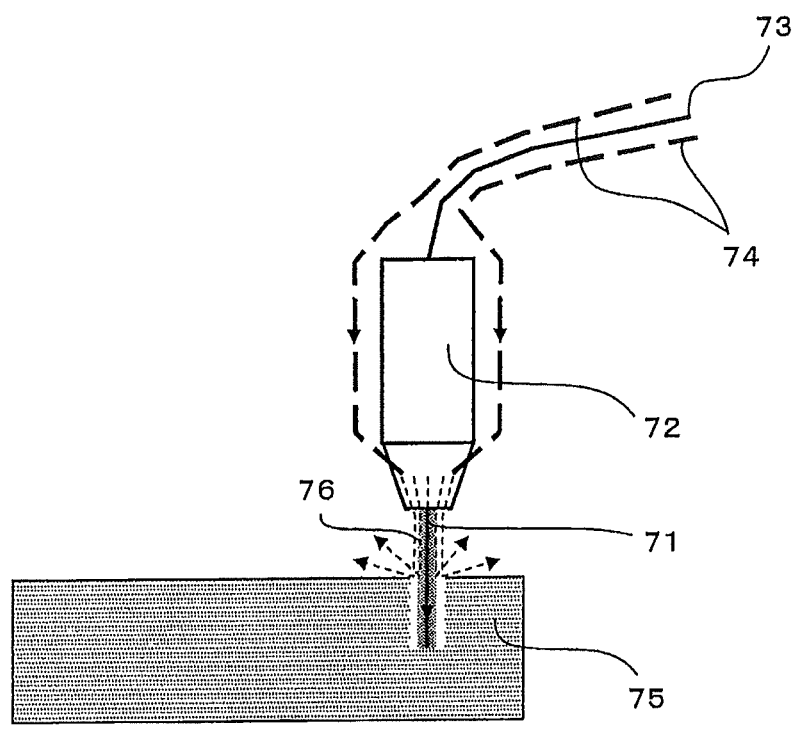
FIG. 8 is a schematic diagram showing an example of laser cutting accompanying with inert gas injection.

Further, in our cutting method, to stably irradiate a laser at a predetermined condition, clogging in the laser head must be prevented. For this, as shown in FIG. 8, a laser ray 71 is introduced into a laser head 72 irradiating the laser lay 71 through an optical fiber 73, and an inert gas 76 such as nitrogen gas is introduced into the laser head 72 through an inert gas supply line 74, and at the time irradiating the laser ray 71 toward a preform 75, preferably the inert gas 76 is injected toward the cutting position of the preform 75 at the same time. At that time, it is preferred that the inert gas is injected coaxially with the laser ray 71.

In a case where the inert gas cannot be supplied and injected as described above, as shown in FIG. 9(A), it is preferred that the pressure (gas pressure) in a laser head 81 is kept to be higher in pressure than that outside the laser head 81. In a case where a preform 82 is cut with a laser ray 83, there is a case where soot 84 is generated by sublimation of the structural material of preform 82 and the soot 84 rises up to the irradiation port side of laser head 81. If the high pressure condition in the head is kept as described above, soot 84 entering into the head 81 can be prevented. However, if the pressure in the head is low, as shown by the dashed line in FIG. 9(A), there is a fear that soot 85 enters into head 81. In such a case, as shown in FIG. 9(B), a method may be employed wherein, while the inside of a laser head 86 is made high in pressure, an inert gas is introduced into the laser head 86 through inert gas supply line 74 similarly to that shown in FIG. 8, and the inert gas 76 is injected toward the cutting position of preform 82 together with the irradiation of laser ray 83. In such a method, entry of soot 84 into laser head 86 can be suppressed, and clogging of the head 86 can be prevented.

Figure 10:
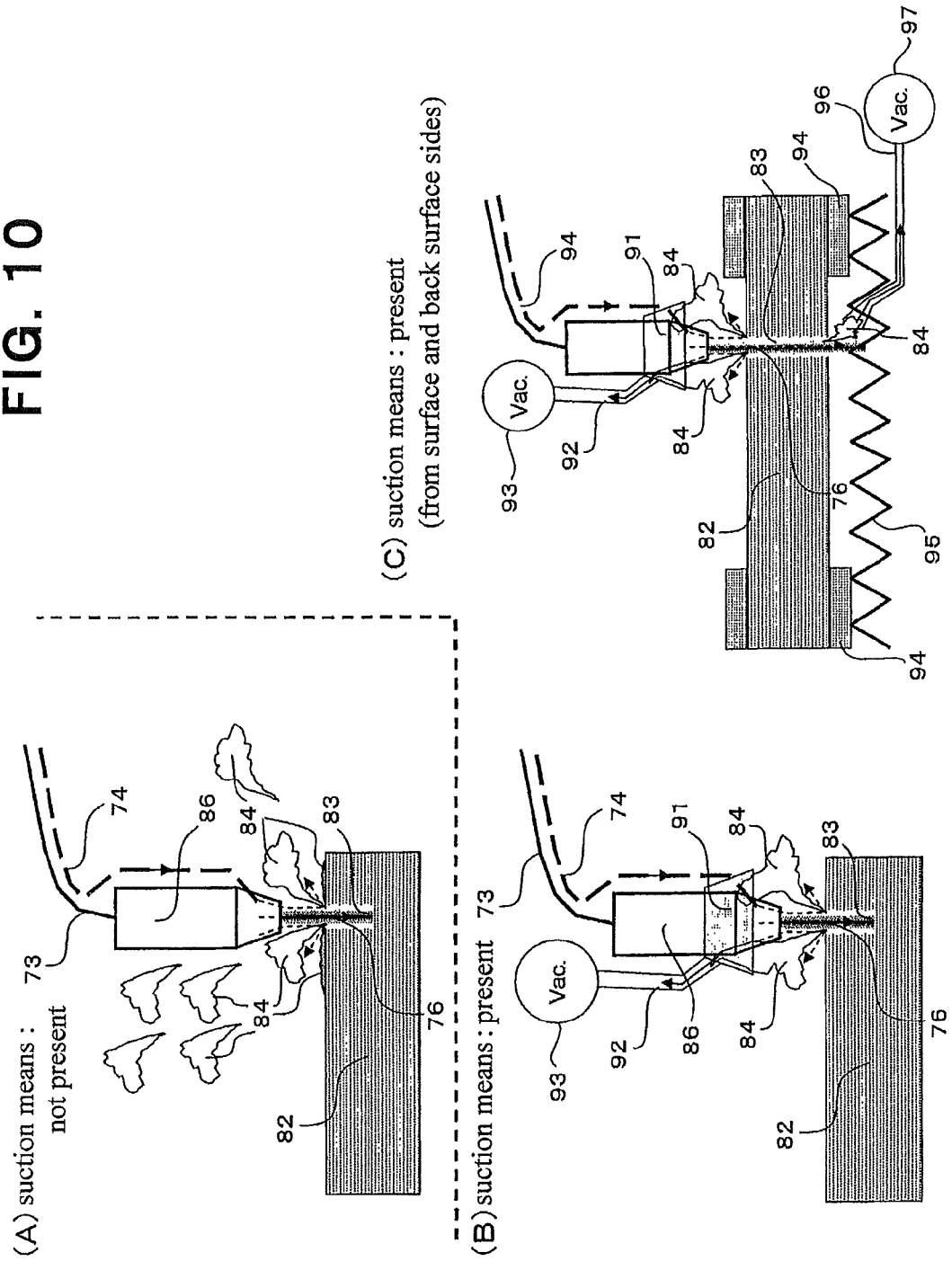
FIG. 10 depicts schematic diagrams exemplifying another problem of soot and treatment methods thereof.

Although the soot generated as described above can be prevented from entering into laser head 86 by injecting inert gas 76 supplied from inert gas supply line 74 toward preform 82 together with the irradiation of laser ray 83 as shown in FIG. 10(A), on the other hand, there is a fear that the soot 84 spreads around the cutting position together with the flow of the injected inert gas 76. To prevent such spreading of soot 84, it is preferred to positively remove the soot 84, and as an effective means, removal by suction is exemplified. As shown in FIG. 10(B), a structure can also be employed wherein a skirt for suction 91 is attached to the lower portion of laser head 86, soot 84 is gathered in this skirt for suction 91, and the soot 84 is suctioned and removed by a vacuum pump 93 through a suction line 92 communicating with the skirt 91.

Furthermore, as shown in FIG. 10(C), there is a case where, immediately after the cutting at a predetermined cutting position of preform 82 has been completed, laser ray 83 goes through preform 82 in its thickness direction and inert gas 76 is also injected up to the back surface side of preform 82. In such a condition, because soot 84 is generated also on the back surface side of preform 82, as shown in FIG. 10(C), it is preferred to provide a suction means also on the back surface side. For example, a structure can be employed wherein a suction line 96 communicating with the upper surface side of a corrugated bed 95 supporting receiving jigs 94 from their lower surface sides is provided, and soot 84 is sucked and removed by a vacuum pump 97.

Figure 11:
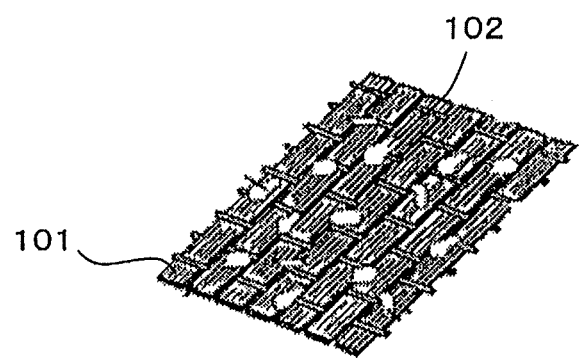
FIG. 11 is a partial perspective view showing an example of a fabric material provided with particle-like resin.

As aforementioned, as a carbon fiber substrate to be cut, a laminate structure can be employed which is formed by integrating fabric materials each provided with a particle-like resin on at least one surface with each other by adhesion via the resin. Namely, as shown in FIG. 11, the figure shows a state where particle-like resin 102 for adhesion is scattered on a carbon fiber fabric 101 (in the example shown in the figure, it is a unidirectional carbon fiber woven fabric), and the laminate can be formed by stacking and integrating such fabric materials with each other. Such a laminate, for example, in a case where a preform is formed as a three-dimensional shape, is effective for maintaining the formed shape at a good condition.

Figure 12:
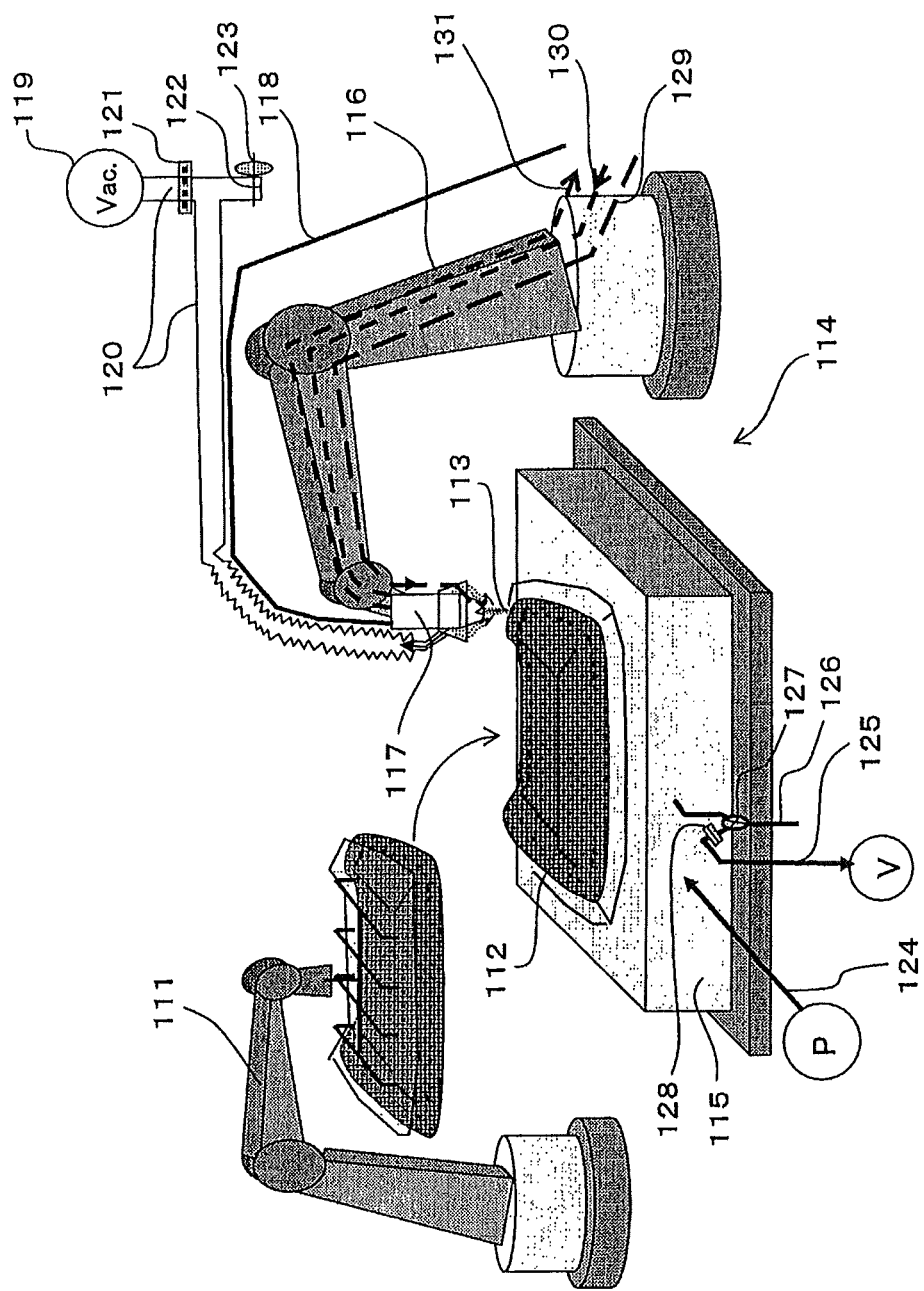
FIG. 12 is a schematic diagram showing an example of a process including cutting of a three-dimensional preform.

If the three-dimensional shape of a preform can be maintained, the conveying and various treatments of the preform are facilitated. For example, as shown in FIG. 12, a three-dimensional preform 112 is conveyed by an articulated robot 111, and even in a case where it is placed on a treatment table 115 of a cutting apparatus 114 using a laser ray 113, the predetermined three-dimensional shape thereof can be easily maintained. In the example shown in FIG. 12, laser ray 113 is irradiated from a laser head 117 attached to the tip portion of another articulated robot 116, the laser ray is introduced to laser head 117 from an optical fiber 118, and a suction line 120 by a vacuum pump 119 is connected to the head 117.

Suction line 120 by vacuum pump 119 is sucked via a filter 121, drain 122 is stored at the lower part side thereof, and drain 122 is appropriately discharged by opening/closing of a valve 123.

Further, a pressurized air line 124 is connected to treatment table 115, and it is served to mold opening and cleaning. Further, a vacuum suction line 125 is connected thereto, and it is served to vacuum cramping of three-dimensional preform 112, the aforementioned soot suction and removal, suction and removal of chip generated at the time of laser cutting or the like. To this suction line 125, a drain line 126 such as one described above, a three way electromagnetic valve 127 for switching the direction for treatment, a filter 128, etc. are provided. An inert gas supply line 129, a cooling water forward line 130, a cooling water return line 131 or the like are communicated with articulated robot 116.

INDUSTRIAL APPLICATIONS

The method for cutting a carbon fiber substrate can be applied to cutting of any substrate or preform comprising a carbon fiber fabric material.

The invention claimed is:

1. A method of cutting a carbon fiber substrate comprising: cutting a carbon fiber substrate configured from a fabric material comprising at least carbon fibers with a laser such that the substrate is cut at initial conditions which have been set so that a state of said substrate that is being cut with said laser can be suppressed with or prevented from deviating from a target state wherein, 1) when said carbon fiber substrate is cut with said laser at a condition being placed on a receiving jig, said substrate is partially received by said receiving jig, 2) a cutting position of said substrate is set at a position where said substrate is not brought into contact with said receiving jig, 3) a contact supporting portion of said receiving jig relative to said substrate is set in a strip, linear or dot form, and 4) a contact surface to said substrate of the receiving jig is formed from a material having at least a heat insulation property.

2. The method according to claim 1, wherein, when said carbon fiber substrate is cut with said laser at a condition being placed on a receiving jig, said substrate is supported by said receiving jig at both sides of a cutting position.

3. The method according to claim 2, wherein said substrate is held from both surface sides at least one portion of substrate supporting portions at said both sides of said cutting position.

4. The method according to claim 1, wherein a gas is injected together with irradiation with a laser from inside of a laser head.

5. The method according to claim 4, wherein said gas is injected coaxially with the irradiated laser.

6. The method according to claim 5, wherein inside of said laser head is kept at a condition higher in pressure than outside of said laser head.

7. The method according to claim 4, wherein a suction means is provided to said laser head, and soot generating at the time of cutting said substrate is suctioned.

8. The method according to claim 1, wherein said carbon fiber substrate to be cut comprises a laminate formed by integrating fabric materials each provided with a particle-like resin on at least one surface with each other by adhesion via said resin.

9. The method according to claim 1, wherein said carbon fiber substrate to be cut is a preform which formed in a predetermined shape.

* * * * *